April 5, 1932. J. C. PRICE 1,852,897
EXPANSIBLE TANK
Filed Feb. 12, 1930
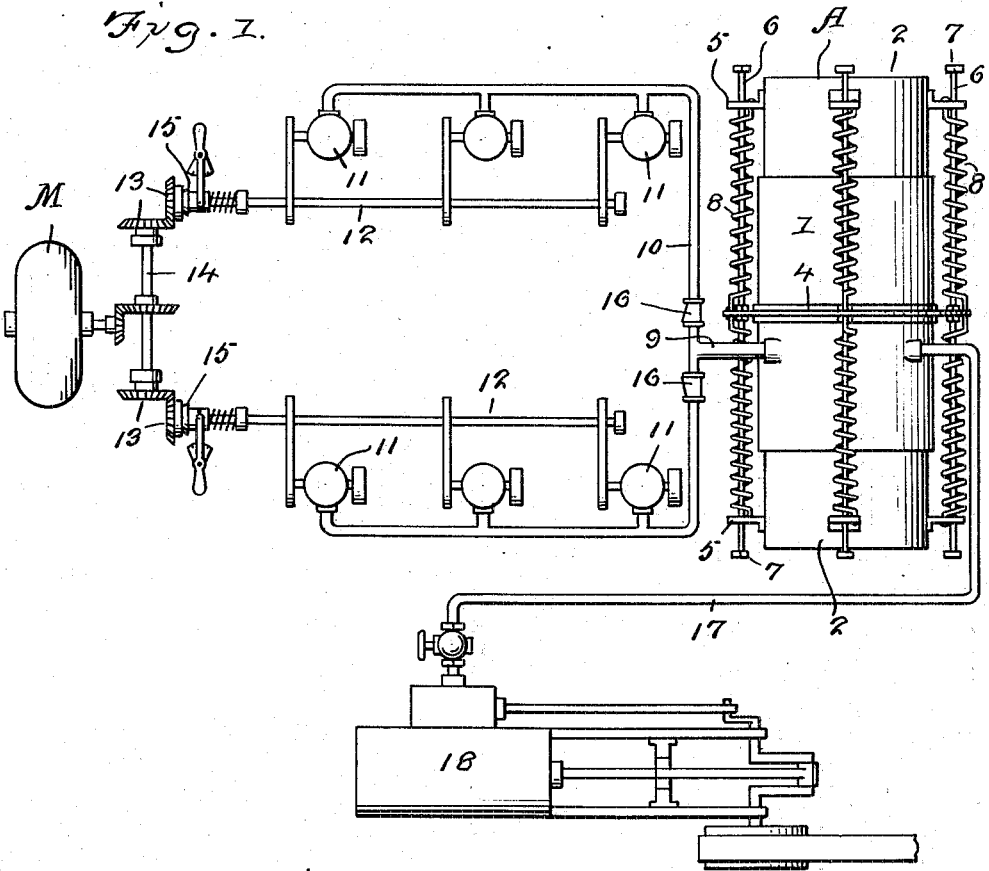
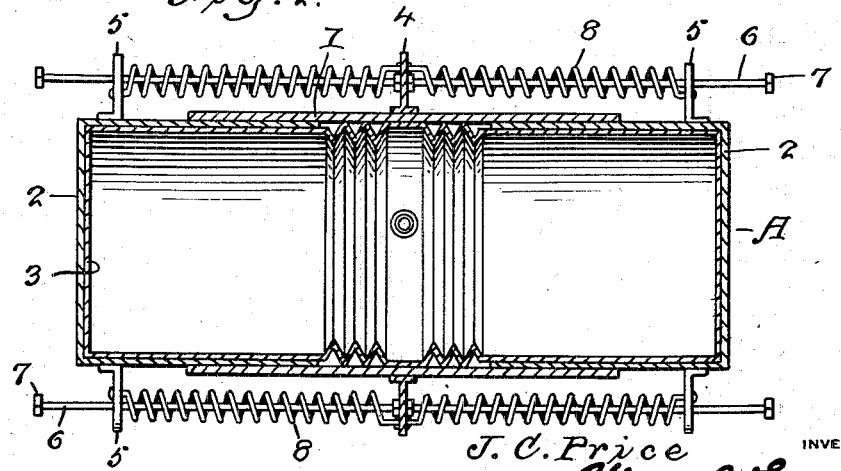
J. C. Price INVENTOR
BY Victor J. Evans ATTORNEY Patented Apr. 5, 1932

1,852,897

UNITED STATES PATENT OFFICE

JOHN C. PRICE, OF GAMOCA, WEST VIRGINIA, ASSIGNOR OF ONE-HALF TO JAMES E. STATON, OF CHARLESTON, WEST VIRGINIA

EXPANSIBLE TANK

Application filed February 12, 1930. Serial No. 427,928.

This invention relates to means for supplying power to machinery through means of a supply of compressed air or the like which is contained in an expansible tank provided with spring means so that when the pressure increases, the tank accommodates itself thereto, with means for supplying the tank with fluid.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a diagrammatic view showing one manner of carrying out the invention.

Figure 2 is a longitudinal sectional view through the tank.

In these views, the letter A indicates a tank which is composed of the cylinder 1 having its ends open and which is supported in any suitable manner against movement and the movable end portions 2 which are slidably arranged in the cylinder and have their inner ends open and their outer ends closed. The tank also includes a member 3 formed of rubber or the like and which fits in the outer part of the tank formed of the parts 1 and 2. Thus when a certain amount of air or the like is introduced into the member 3, the same will expand and press outwardly the parts 2 so that the tank is an expansible one.

A ring 4 is connected with the cylinder 1 at the center of the cylinder, and brackets 5 are fastened to the parts 2 adjacent the outer ends of said parts. Rods 6 have their inner ends connected with the member 4 and some of these rods pass through holes in the brackets on one of the parts 2 and the other rods pass through holes in the brackets on the other part 2. These rods extend a considerable distance beyond the brackets, when the tank is contracted, and have heads 7 on their outer ends which will be engaged by the brackets when the tank is expanded so that these heads limit the expansible action of the tank. The brackets, striking the ends of the cylinder 1, will limit the inward movement of the end parts 2.

A spring 8 surrounds each rod and has one end connected with the bracket 5 and its other end to the member 4. These springs tend to resist the outward movement of the end parts 2. The springs are so arranged and constructed that they will prevent outward movement of the parts 2 until a certain degree of pressure is in the tank, after which the end parts move outwardly, thus increasing the dimensions of the tank.

A pipe 9 connects the interior of the tank with a pipe line 10 to which the compressors 11 are connected, and these compressors are driven from the shafts 12 connected by the gears 13 with a shaft 14 driven from a motor M. Each shaft 12 is provided with a clutch 15 so that it can be connected with or disconnected from the shaft 14 and a check valve 16 is placed in the line 10, one on each side of the pipe 9. Thus both sets of compressors can be used to supply air to the tank or either one set or the other can be used to supply air to the tank while the other set is idle.

A pipe 17 supplies air from the tank to an air motor 18 or the like, so that the air from the tank is used to run various kinds of machinery or may be used for other purposes.

The tank is provided with the usual safety valve and gauge.

From the foregoing it will be seen that I have provided means for supplying air or the like to an expansible tank which is so constructed as to hold the pressure of fluid in the same constant. Thus this tank will furnish air to an air motor or the like at a constant pressure so that it is not necessary to supply a constant flow of air to the tank as the compressors need only be put in operation at intervals.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An apparatus of the class described comprising a tank including a stationary cylindrical part, a pair of end parts slidably arranged in the cylindrical part, a hollow member of resilient material fitting in the tank and forcing the end parts outwardly when said member is expanded by fluid placed in the same, spring means connecting the end members with the cylindrical part for resisting outward movement of the end parts, means for introducing fluid into the tank and outlet means connected with the tank.

2. An apparatus of the class described comprising a tank including a stationary cylindrical part, end parts slidably arranged in the cylindrical part, a hollow member of resilent material fitting in the tank, brackets on the cylindrical part and the end parts, rods connected with the brackets of the cylindrical part and passing through holes in the brackets on the end parts, springs encircling the rods and having their outer ends connected with the brackets on the end parts and their inner ends with the brackets on the cylindrical part, the outer ends of the rods having heads thereon for limiting the outward movement of the end parts.

In testimony whereof I affix my signature.

JOHN C. PRICE.